United States Patent [19]

Hattori et al.

[11] Patent Number: 5,774,850
[45] Date of Patent: Jun. 30, 1998

[54] SOUND CHARACTERISTIC ANALYZER WITH A VOICE CHARACTERISTIC CLASSIFYING TABLE, FOR ANALYZING THE VOICES OF UNSPECIFIED PERSONS

[75] Inventors: Ichiro Hattori, Zushi; Akira Suzuki, Yokohama, both of Japan

[73] Assignee: Fujitsu Limited & Animo Limited, Kanagawa, Japan

[21] Appl. No.: 638,295

[22] Filed: Apr. 26, 1996

[30] Foreign Application Priority Data

Apr. 26, 1995 [JP] Japan ................................. 7-102631

[51] Int. Cl.[6] ............................................... G10L 7/08
[52] U.S. Cl. ........................................ 704/250; 704/272
[58] Field of Search ..................................... 395/2.55, 2.5, 395/2.79, 2.86, 2.59, 2.56, 2.58, 2.6; 704/250, 272, 246, 241, 270, 277, 271, 249, 251

[56] References Cited

U.S. PATENT DOCUMENTS

| | | | |
|---|---|---|---|
| 4,827,522 | 5/1989 | Matsuura et al. .................. | 395/2.53 |
| 4,989,249 | 1/1991 | Oka et al. ........................... | 395/2.09 |
| 5,046,099 | 9/1991 | Nishimura .......................... | 395/2.53 |
| 5,161,210 | 11/1992 | Druyvesteyn et al. ............ | 395/2.09 |
| 5,559,927 | 9/1996 | Clynes ................................ | 395/2.67 |
| 5,567,162 | 10/1996 | Park .................................... | 395/2.79 |

FOREIGN PATENT DOCUMENTS 3-143434  6/1991  Japan ............................. G06F 15/42

*Primary Examiner*—Allen R. MacDonald
*Assistant Examiner*—Richemond Dorvil
*Attorney, Agent, or Firm*—Helfgott & Karas, P.C.

[57] ABSTRACT

A voice characteristics analyzer analyzes the voices of unspecified persons through conventional Karaoke systems. A voice characteristics extraction device extracts spoken voice characteristics when a user speaks specific words. A voice characteristic classification table pre-stores analysis information derived from non-user voices and corresponding to voice characteristics of these specific words. An analysis information output device outputs results of the characteristics analysis that compares current user data with the pre-stored information.

9 Claims, 12 Drawing Sheets

SPEECH INSTRUCTION SCREEN (A)

ANALYSIS RESULT OUTPUT SCREEN (B)

| FRAME NUMBER | 1 | 2 | 3 | 4 | 5 | 6 | 7 | ..... | N |
|---|---|---|---|---|---|---|---|---|---|
| PITCH FREQUENCY | 123 | 134 | 105 | 176 | 154 | 109 | 146 | ..... | 128 |

| FREQUENCY | 0 | 10 | 20 | 30 | 40 | 50 | 60 | ..... | 10,000 |
|---|---|---|---|---|---|---|---|---|---|
| FRAME 1 | 1 | 1 | 1 | 1 | 1 | 1 | 1 | ..... | 0 |
| FRAME 2 | 0 | 0 | 0 | 0 | 1 | 1 | 1 | ..... | 0 |
|  | ... | ... | ... | ... | ... | ... | ... | .... | .... |
| FRAME N | 0 | 0 | 0 | 0 | 0 | 0 | 0 | ..... | 0 |

FIG. 13

| RANGE OF SPEAKING DURATION | | CLASSIFICATION VALUE |
|---|---|---|
| 0 | TWO SECONDS | TIME 1 |
| TWO SECONDS | 9,999 SECONDS | TIME 2 |

FIG. 14

| RANGE OF MAXIMUM PITCH FREQUENCY VALUES | | CLASSIFICATION VALUE |
|---|---|---|
| 0 | 150Hz | MAXIMUM 1 |
| 150Hz | 9999Hz | MAXIMUM 2 |

FIG. 15

| RANGE OF AVERAGE PITCH FREQUENCY VALUES | | CLASSIFICATION VALUE |
|---|---|---|
| 0 | 150Hz | AVERAGE 1 |
| 150Hz | 9999Hz | AVERAGE 2 |

FIG. 16

| SONARGRAM PATTERN NUMBER | PATTERN 1 | PATTERN 2 | PATTERN 3 | PATTERN 4 |
|---|---|---|---|---|
| CLASS | PHASE 1 | PHASE 2 | PHASE 3 | PHASE 4 |
| NUMBER OF MATCHING VALUES | N1 | N2 | N3 | N4 |

FIG. 17

| CLASSIFICATION | | | | CHARACTER CLASSIFICATION VALUES |
|---|---|---|---|---|
| TIME 1 | MAXIMUM 1 | AVERAGE 1 | PHASE 1 | CHARACTER 1 |
| TIME 1 | MAXIMUM 1 | AVERAGE 1 | PHASE 2 | CHARACTER 2 |
| TIME 1 | MAXIMUM 1 | AVERAGE 1 | PHASE 3 | CHARACTER 3 |
| TIME 1 | MAXIMUM 1 | AVERAGE 1 | PHASE 4 | CHARACTER 4 |
| TIME 1 | MAXIMUM 1 | AVERAGE 1 | PHASE 1 | CHARACTER 5 |
| .. | .. | .. | .. | ... |
| TIME 2 | MAXIMUM 2 | AVERAGE 2 | PHASE 4 | CHARACTER 32 |

FIG. 18

| CHARACTER CLASSIFICATION | COMMENT |
|---|---|
| CHARACTER 1 | CHARACTER ANALYSIS COMMENT 1 |
| CHARACTER 2 | CHARACTER ANALYSIS COMMENT 2 |
| CHARACTER 3 | CHARACTER ANALYSIS COMMENT 3 |
| CHARACTER 4 | CHARACTER ANALYSIS COMMENT 4 |
| CHARACTER 5 | CHARACTER ANALYSIS COMMENT 5 |
| ... | ..... |
| CHARACTER 32 | CHARACTER ANALYSIS COMMENT 32 |

FIG. 19

| OBJECT PERSON A/B | CHARACTER 1 | CHARACTER 2 | ... | CHARACTER 32 |
|---|---|---|---|---|
| CHARACTER 1 | CONGENIALITY 1!!XX!!1 | CONGENIALITY 1!!XX!!2 | ... | CONGENIALITY 1!!XX!!32 |
| CHARACTER 2 | CONGENIALITY 2!!XX!!1 | CONGENIALITY 2!!XX!!2 | ... | CONGENIALITY 2!!XX!!32 |
| CHARACTER 3 | CONGENIALITY 3!!XX!!1 | CONGENIALITY 3!!XX!!2 | ... | CONGENIALITY 3!!XX!!32 |
| CHARACTER 4 | CONGENIALITY 4!!XX!!1 | CONGENIALITY 4!!XX!!2 | ... | CONGENIALITY 4!!XX!!32 |
| ... | ... | ... | ... | ... |
| CHARACTER 32 | CONGENIALITY 32!!XX!!1 | CONGENIALITY 32!!XX!!2 | ... | CONGENIALITY 32!!XX!!32 |

| CONGENIALITY CLASSIFICATION VALUES | COMMENT |
|---|---|
| CONGENIALITY 1!!XX!!1 | CONGENIALITY COMMENT 1!!XX!!1 |
| CONGENIALITY 2!!XX!!1 | CONGENIALITY COMMENT 2!!XX!!1 |
| CONGENIALITY 3!!XX!!1 | CONGENIALITY COMMENT 3!!XX!!1 |
| CONGENIALITY 4!!XX!!1 | CONGENIALITY COMMENT 4!!XX!!1 |
| CONGENIALITY 5!!XX!!1 | CONGENIALITY COMMENT 5!!XX!!1 |
| ..... | ....... |
| CONGENIALITY 32!!XX!!32 | CONGENIALITY COMMENT 32!!XX!!32 |

| CLASSIFICATION | | | | HEALTH STRESS CLASSIFICATION VALUES |
|---|---|---|---|---|
| TIME 1 | MAXIMUM 1 | AVERAGE 1 | PHASE 1 | STRESS 1 |
| TIME 1 | MAXIMUM 1 | AVERAGE 1 | PHASE 2 | STRESS 2 |
| TIME 1 | MAXIMUM 1 | AVERAGE 1 | PHASE 3 | STRESS 3 |
| TIME 1 | MAXIMUM 1 | AVERAGE 1 | PHASE 4 | STRESS 4 |
| TIME 1 | MAXIMUM 1 | AVERAGE 2 | PHASE 1 | STRESS 5 |
| .. | .. | .. | .. | .... |
| TIME 2 | MAXIMUM 2 | AVERAGE 2 | PHASE 4 | STRESS 32 |

FIG. 22

| HEALTH STRESS CLASSIFICATION VALUES | COMMENT |
|---|---|
| STRESS 1 | STRESS COMMENT 1 |
| STRESS 2 | STRESS COMMENT 2 |
| STRESS 3 | STRESS COMMENT 3 |
| STRESS 4 | STRESS COMMENT 4 |
| STRESS 5 | STRESS COMMENT 5 |
| . . . . . | . . . . . . . |
| STRESS 32 | STRESS COMMENT 32 |

SOUND CHARACTERISTIC ANALYZER WITH A VOICE CHARACTERISTIC CLASSIFYING TABLE, FOR ANALYZING THE VOICES OF UNSPECIFIED PERSONS

BACKGROUND OF THE INVENTION

This invention relates to an audio signal processing system that analyzes an individual's characteristics of different types using the spoken sound of predetermined words.

A conventional voice analysis approach is shown in FIG. 1. In these prior art systems, the specified speaker, a subject for analysis, must record a voice reference in advance; then the reference voice and the input voice from the same speaker were analyzed and compared. A prior art system includes a voice input device 91, a memory device 92 for the reference voice, a processing device 93 for comparing the input voice with the reference voice stored in memory, and an output device 94 for outputting the processed result from the comparison processing device.

The user first inputs spoken words to the input device 91 to serve as the reference voice, for example, the speaker's normal voice when he/she feels healthy and relaxed. These words are stored in the reference voice memory device 92.

When the user wants to check his/her physical condition, the user's voice is input again into the input device 91. The comparison processing device 93 then calculates the differences between the new voice sample and the voice stored in the reference voice memory device 92. The results are usually presented to the user through the output device 94. In this case, the comparison is made by simply comparing the voices, without a comparison of the frequency characteristics of the voices.

In the conventional method, problems arise. For example, no processing can be performed without inputting a reference voice in advance. This means that analysis can only be made for the specified (pre-recorded) speaker's voice. Moreover, when analyzing and comparing multiple speakers' voices, multiple reference voices were conventionally required.

SUMMARY OF THE INVENTION

The analyzer in accordance with the invention can solve the problem by a present user or users inputting voices saying predetermined specific words. The users have not provided reference words in advance. Means for voice characteristic extraction extracts the sound characteristics of the words contained in the input. A voice characteristics classifying table stores in advance analyzed information, corresponding to voice characteristics, for the same specific words which are to be spoken at the input step by the current users. Analyzed information output means outputs analyzed information corresponding to the voice characteristics which have been extracted using the means for voice characteristics extraction. The outputted analyzed information is based on the voice characteristic classifying table, although the information in the classifying table is not based upon the present users of the system.

Namely, the voice characteristics of many different unspecified speakers are extracted in sonargram patterns and in information related to pitch frequencies. The differences between the extracted results are prepared as the voice characteristic classification table. Then, the characteristics of the users voices which are input during a sampling, are extracted according to the voice characteristics analysis table and stored characteristics, and health condition, and degree of stress can be presented by relating the user's new input to the stored information of the same words. Also, by inputting two persons' voices, the characteristics of both persons can be analyzed and the compatibility of the two persons may be shown.

Further objects and advantages of the invention will be apparent from the following detailed description and drawings. The invention, accordingly, comprises the features of construction, combination of elements, an arrangement of parts which will be exemplified in the constructions hereinafter setforth, and the scope of the invention will be indicated in the claims.

BRIEF DESCRIPTION OF THE DRAWING

For a fuller understanding of the invention, references is had to the following description taken in connection with the accompanying drawings, in which:

FIG. 13 is a data format for a speaking duration classification table;

FIG. 14 is a data format for a maximum pitch frequency value classification table;

FIG. 15 is a data format for an average pitch frequency value classification table;

FIG. 16 is a data format for a sonargram classification table;

FIG. 17 is a data format for a character classification value table;

FIG. 18 is a data format for a character analysis information table;

FIG. 19 is a data format for a compatibility classification value table;

FIG. 20 is a data format for a compatibility analysis information table;

FIG. 21 is a data format for a health classification value table; and

FIG. 22 is a data format for a health analysis information table.

DESCRIPTION OF A PREFERRED EMBODIMENT

Figure 1:
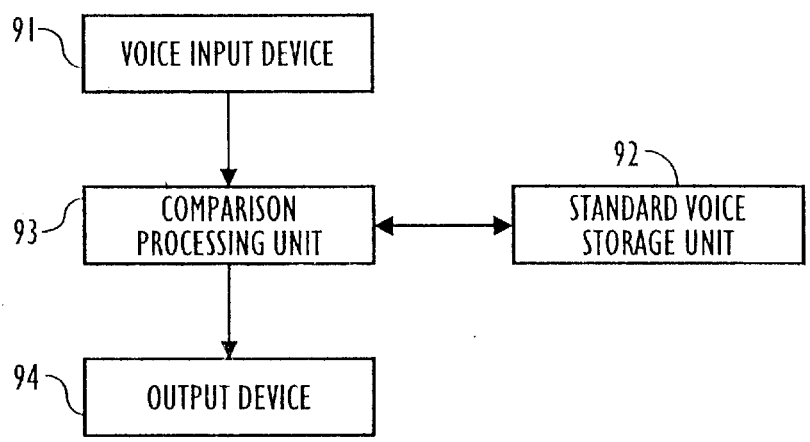
FIG. 1 is a block diagram of a voice analysis system of the prior art.
Figure 2:
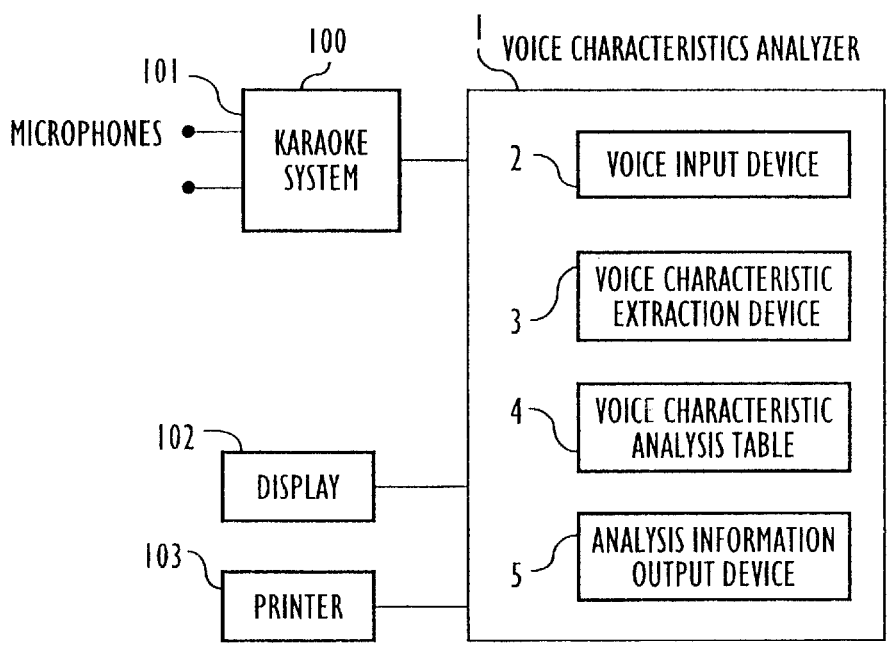
FIG. 2 is a functional block diagram of a voice characteristics analyzer in accordance with the invention.

FIG. 2 shows an embodiment in accordance with the invention of a voice characteristics analyzer and its associated supporting components. In FIG. 2, items 100 to 103 are input and output devices that connect to a voice characteristics analyzer. The karaoke machine 100 accepts the users' voices through standard audio microphones 101. A display 102, typically a standard CRT monitor, is provided. A printer 103 outputs a hardcopy record of the processing results.

An input voice digitizer 2, performs an A/D conversion on the input voice from microphone 101 of the karaoke machine 100. The digitized input voice is then stored in a temporary memory (not shown).

The voice characteristics processor 3, extracts the voice characteristics from the temporarily stored digitized voice. These characteristics are based on speaking duration information, maximum pitch frequency, average pitch frequency, and a time frequency distribution pattern (sonargram pattern) as described hereinafter.

A voice characteristics analysis table 4 holds stored sentences which relate to the health condition and personal character of each voice characteristic. In this embodiment, the voice characteristics analysis table 4 is divided into a classification table and an analysis information table, but the classification table may be omitted. Also, the voice characteristics analysis table may be related to a health analysis and is applicable to a health classification table and health analysis information table. A detailed configuration of the voice characteristics analysis table is shown in FIGS. 17 to 22.

A personality classification table is shown in FIG. 17; a personality analysis information table is shown in FIG. 18. The health classification table is shown in FIG. 21, and the health analysis information table is shown in FIG. 22.

An output mechanism 5 is provided (FIG. 2) for the analyzed information. Sentence data corresponding to the voice characteristics analysis table 4 is retrieved using the extracted characteristics, and the resultant sentence data is passed to the output devices 102 and 103.

Figure 3:
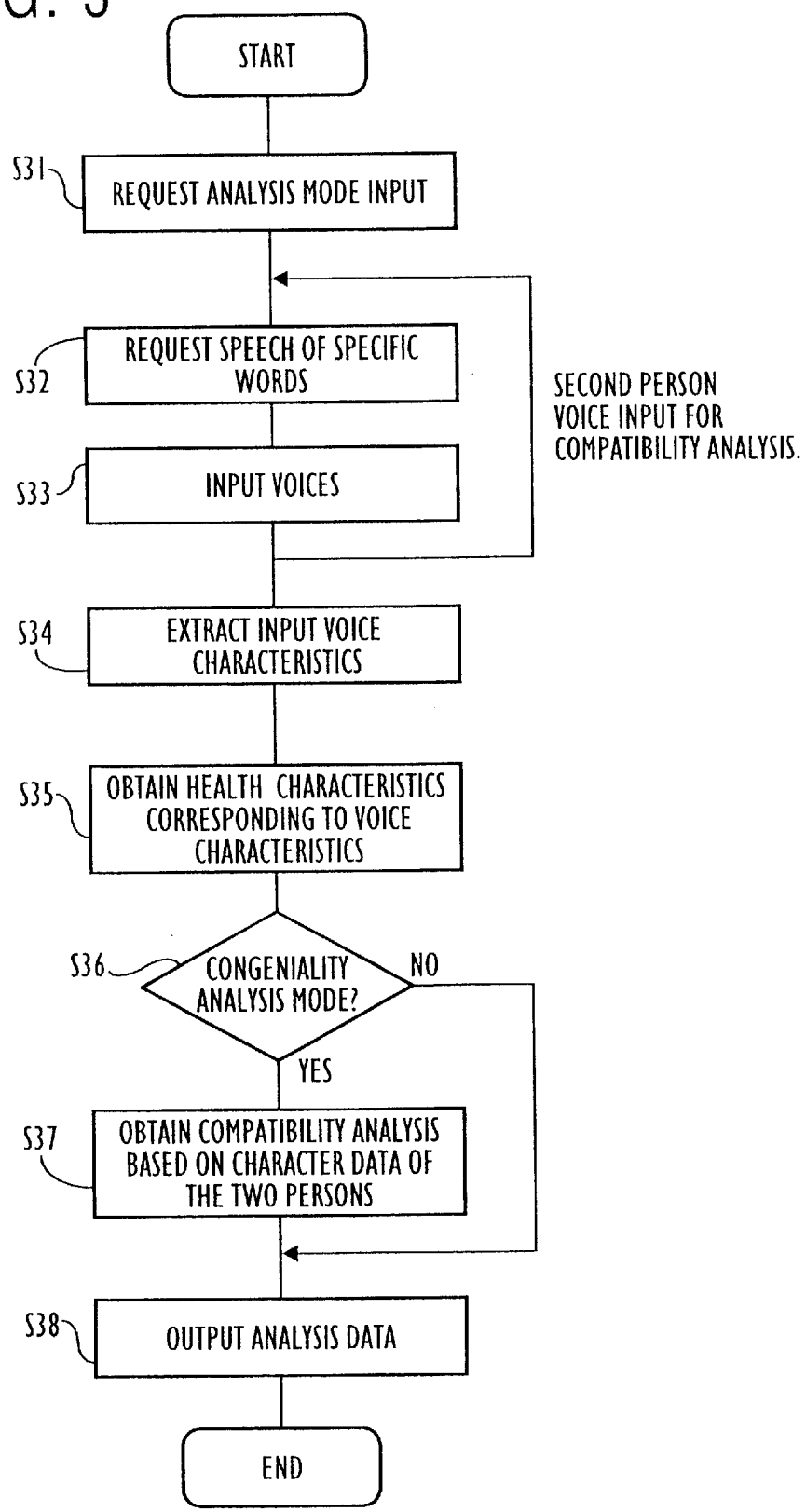
FIG. 3 is an operational flow chart of the voice characteristics analyzer in accordance with the invention.
Figure 4:
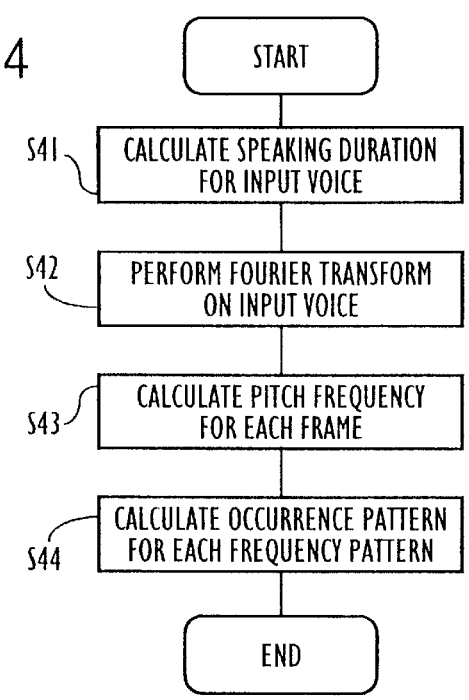
FIG. 4 is an operational flow chart for voice characteristic extraction in the embodiment of FIG. 2.
Figure 5:
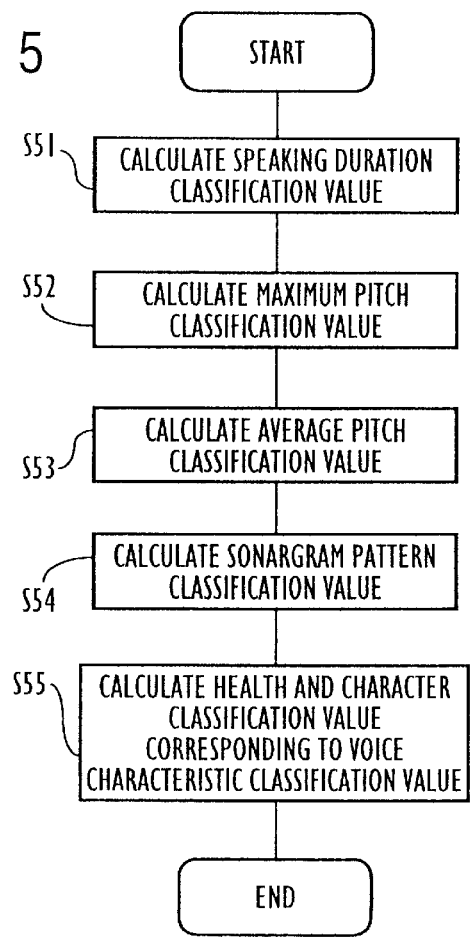
FIG. 5 is an operational flow chart for health and character analysis processing in accordance with the invention.
Figure 6A:
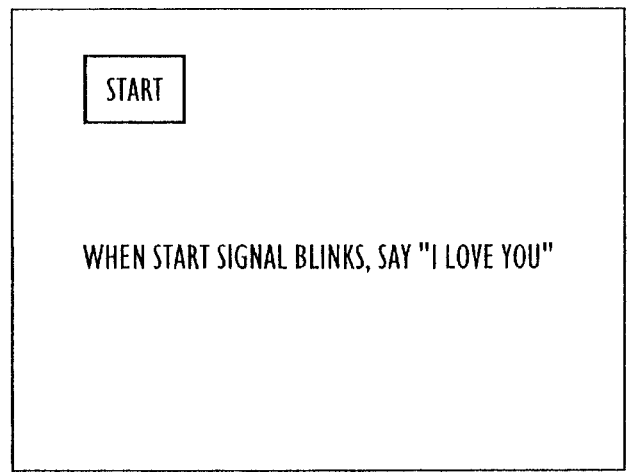
FIGS. 6A and 6B are respectively a user instruction screen and analysis result output screen in accordance with the invention.
Figure 6B:
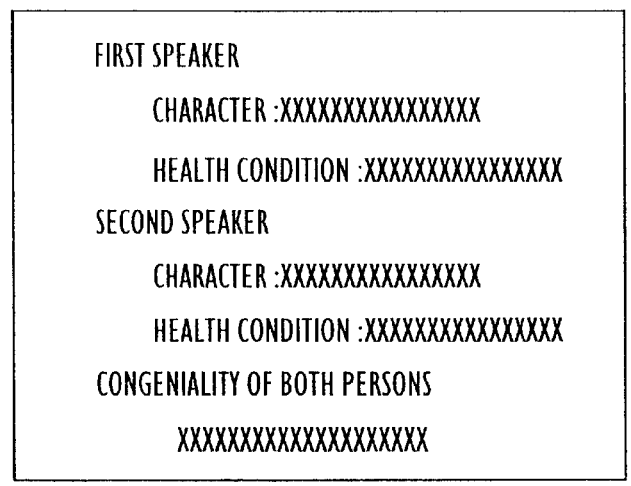

FIG. 3 is an operational flowchart for the voice characteristics analyzer of FIG. 2. FIG. 4 is an operational flowchart of the voice characteristics extraction processing, and details the operation of processing step S34 in FIG. 3. FIG. 5 is an operational flowchart of the health/personality analysis processing, and details the operation of processing step S35 in FIG. 3. FIGS. 6a and 6b show examples of input and output screens of the present invention.

An example of the operations of this invention is explained by using the flowcharts in FIGS. 3 to 5 and resultant processed data as shown in FIGS. 7 to 22.

First, the user must specify (FIG. 3) whether he/she would like an analysis of one person's health and personality or the compatibility between the health and personalities of two persons (S31). After this designation is made, the system requests the user to say certain specified words into a microphone (S32). The system flashes (FIG. 6A and 6B) a "START" message on the display, as a visual cue for the user to start speaking. The specific words to be spoken are more effective if they include many vowel sounds, for example, "I LOVE YOU", because it is easier to retrieve the voice characteristics in the analysis processing stage from vowel sounds. When a user speaks the specified words into the microphone 101, the words are converted from analog to digital (A/D) format.

Figure 7:
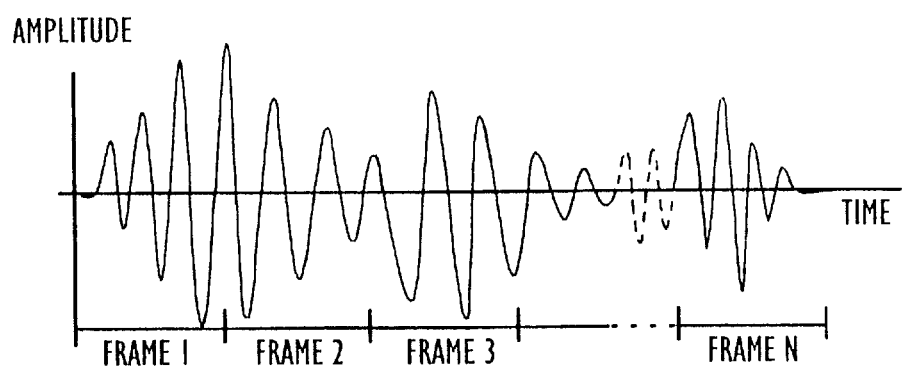
FIG. 7 is an exemplary wave form of input voice data.
Figure 8:
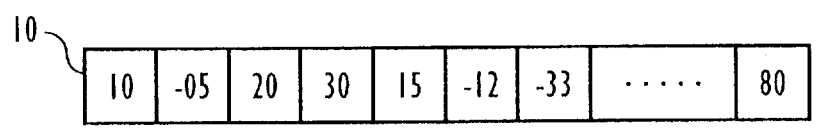
FIG. 8 shows input voice data after analog to digital conversion.

This digitized voice data is then stored in a memory device (S33). When the two-person analysis mode is selected at step S31, operations S32 and S33 are done twice. FIG. 7 shows an example of the waveform of the voice data that is to be digitized. FIG. 8 shows digitized instantaneous amplitude values that are stored in memory.

Next, the characteristics of the digitized voice data stored in the memory are retrieved (S34). From the digitized voice data shown in FIG. 8, a part (speaking duration) of the specific word is calculated. That is, a memory position exceeding a specified strength (level above background noise) shown in FIG. 8 is obtained. Then voice less than specified levels are continued for a certain time, then the first position information of the voice under the specified level is obtained. The speaking duration is calculated (S41) by multiplying the intervals (number of items) of these two positions and the unit time of the voice data storage.

Figures 9, 10:
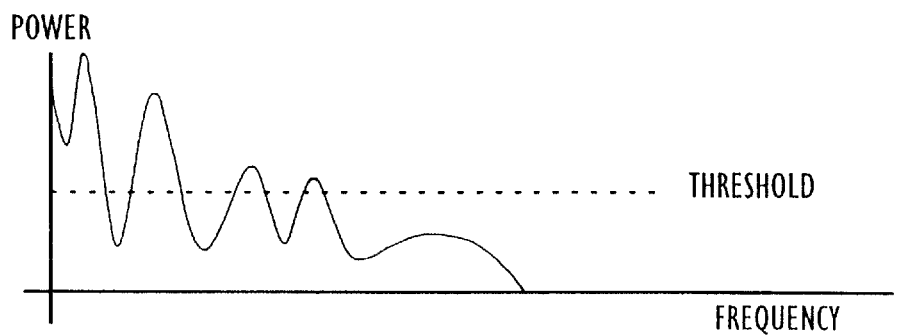
FIG. 9 is a curve of a voice data frame after fast Fourier transfer conversion.
FIG. 10 is a format for pitch frequency data in accordance with the invention.

Next, by performing FFT (fast Fourier transform) processing for the utterance in the digitized voice data, the data shown in FIG. 9 is obtained. In FFT processing, the utterance parts are separated into a specified number of frames (n numbers) as shown in FIG. 7, and waveform data (FIG. 9) of the power spectrum for each frame frequency is obtained (S42).

Figures 11, 12:
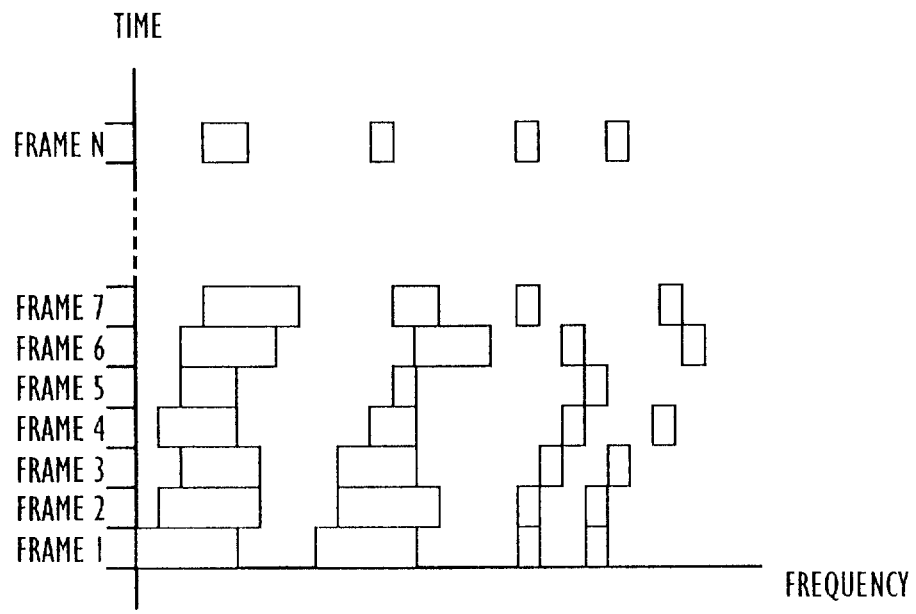
FIG. 11 is illustrates sonargram pattern data.
FIG. 12 is a format for sonargram pattern data.

Then, pitch frequencies are calculated using the waveform data of power spectra for each frame, and values are stored in the memory (S43). The pitch frequency denotes the frequencies corresponding to the first peak in each frame of waveform data. FIG. 10 shows a table in which pitch frequencies from 1 to N frames are stored. Moreover, for the power spectrum data in FIG. 9, frequencies exceeding the threshold value are calculated, and stored in the memory (S44). The data format in the memory is shown in FIG. 12, and data is shown in FIG. 11.

Next, the processing step (S35) for obtaining health and personality analysis data corresponding to voice characteristics in FIG. 3 is explained using the flowchart in FIG. 5. First, values for speaking duration classification are calculated (S51). Speaking duration classification table 20 shown in FIG. 13 is retrieved by making the key point the speaking duration data calculated in S41 shown in FIG. 4.

A corresponding record classification value is retrieved for which the speaking duration data is entered in the first and second columns from the left in speaking duration classification table 20. For example, if the maximum value of the pitch frequency is 176 Hz, the classification value "Max. 2" is calculated.

As for the pitch frequency maximum value, the classification value for the pitch frequency mean value is calculated using pitch frequency data 11 and the pitch frequency mean value classification table in FIG. 15 (S53).

Next, the sonargram pattern classification values are calculated (S54). FIG. 12 shows the format of sonargram pattern data 12, and the data is also shown in FIG. 11. The sonargram pattern data 12 denotes the time distribution patterns of each frequency band included in the voice utterances. In this operation example, frame number is used instead of time values. This sonargram pattern data 12 can be obtained from the data on which FFT has been performed for each frame. That is, whether frequencies exceed the threshold value is judged from the data after FFT conversion. If the frequency threshold is exceeded, 1 is stored at the position corresponding to the bandwidth in the sonargram pattern data and frame number, and if the frequency threshold is not exceeded, 0 is stored.

In this device, multiple sonargram pattern data of unspecified personalities (data not based upon any particular individual) or health conditions are stored in advance to use them in analysis.

The operation S54 prepares sonargram pattern data using voice data input, and performs comparison processing with the pre-stored multiple sonargram pattern data. The comparison processing is carried out using the sonargram classification table 23 of FIG. 16. The number of each sonargram is stored in the first stage of the sonargram classification table 23 in FIG. 16 for comparison, and the corresponding sonargram pattern can be retrieved by specifying the number. The second stage includes classification values which are utilized when the degree of coincidence is high.

The third stage is the working area in comparison processing, and the number of coinciding ones and zeros in the sonargram pattern data is stored.

Comparison processing is carried out for all the sonargram patterns, and a classification value corresponding to the sonargram pattern with the highest coincidence is obtained.

The personality classification table 24 in FIG. 17 and health classification table 28 in FIG. 21 are retrieved using the four kinds of classification values calculated in the previous operation as the key points then personality and health condition classification values are obtained (S55). For example, if the four classification values are "Time 1" "Max. 1" "Flat 1", and "Face 3", then the personality classification value becomes "Personality 3", and the health classification value obtained is "healthy, and stress 3".

When the two-persons analysis mode is used to analyze compatibility between two persons, the above processing must be carried out twice. Also, as shown in FIG. 3, in this mode (S36), the compatibility analysis data of the two persons must be calculated (S37). For this processing, compatibility classification value table 26 must be retrieved first using each other's personality classification values as the key points in order to obtain the compatibility classification value. For example, if the personality classification value of one is "Personality 3", and the other is "Personality 2," the compatibility classification value is "compatibility 3.2."

The compatibility analysis information Table 25 in FIG. 18, the health analysis information Table 29 in FIG. 22, and the compatibility analysis information Table 27 in FIG. 20 are retrieved using the compatibility classification value, health classification value, and the compatibility classification value as the key points. The analysis result that is the documented information is then retrieved, and this is displayed on display 102, and printed out to the printer 103.

The voice characteristics analyzer, which is connected to a Karaoke device, has been explained above. Another possible use is in personal computer communications. It may also be used as a stress check system in vehicles. By continuously monitoring the driver's voice, the driver could be advised to rest if the level of stress became too high.

As explained above, this invention performs personality analysis, compatibility analysis, and health analysis (checking stress) for unspecified users (speakers) simply by having the user speak specified words. Reference (earlier) recordings of the speakers voice are not used for the analysis. Therefore everybody can use the analyzer immediately.

What is claimed is:

1. A sound characteristic analyzer comprising:

requesting means for requesting a user to speak predetermined words by displaying the predetermined words on a display;

input means for inputting by a user of spoken sound of predetermined words;

extracting means for extracting voice characteristics of said spoken sound of predetermined words inputted by said input means;

a voice characteristics classifying table for prestoring analysis information corresponding to a plurality of voice characteristics of said predetermined words, said prestored analysis information being derived from spoken sounds of others than said user; and an analysis information output means for outputting analysis information, based upon said voice characteristics classifying table and said voice characteristics extracted from said user spoken sound by said extracting means.

2. A sound characteristic analyzer as in claim 1, wherein said voice characteristics classifying table stores analysis information on health conditions corresponding to said voice characteristics.

3. A sound characteristic analyzer as in claim 1, wherein said voice characteristics classifying table stores analysis information on individual human traits corresponding to said voice characteristics.

4. The sound characteristics analyzer as in claim 1, wherein said input means is a Karaoke microphone connected to said voice characteristics analyzer.

5. The sound characteristics analyzer as in claim 1, wherein said predetermined words contain many vowel sounds.

6. The sound characteristics analyzer as in claim 1, wherein said voice characteristics are classified according to voice speaking duration of predetermined words.

7. The sound characteristics analyzes as in claim 1, wherein said voice characteristics are classified by pitch characteristics of specific words of said inputted predetermined words.

8. The sound characteristics analyzer as in claim 1, wherein said voice characteristics are classified by sonargram information, that includes the time distribution of said extracted voice characteristics by frequency bandwidth.

9. A sound characteristic analyzer comprising:

input means for inputting by users of spoken sounds of predetermined words;

extracting means for extracting voice characteristics of said user spoken sounds of the predetermined words inputted by said input means;

a suitableness degree classifying table for storing analysis information corresponding to a relationship between two human voice characteristics, and an analysis information output means for outputting analysis information based upon said suitableness degree classifying table and said two human voice characteristics extracted by said extracting means from said user spoken sounds of predetermined words.

* * * * *